(12) United States Patent
Sergyeyenko et al.

(10) Patent No.: US 7,571,546 B1
(45) Date of Patent: Aug. 11, 2009

(54) LIGHT LINE GENERATING DEVICE

(75) Inventors: Oleksiy P. Sergyeyenko, Ontario (CA); James Marshall, Ontario (CA)

(73) Assignee: Black and Decker, Newark, DE (US)

( * ) Notice: Subject to any disclaimer, the term of this patent is extended or adjusted under 35 U.S.C. 154(b) by 30 days.

(21) Appl. No.: 12/024,265

(22) Filed: Feb. 1, 2008

(51) Int. Cl.
 *G01C 15/00* (2006.01)
(52) U.S. Cl. .................. 33/291; 33/286; 33/DIG. 21
(58) Field of Classification Search ............. 33/281, 33/283, 286, 290, 291, DIG. 21
See application file for complete search history.

(56) References Cited

U.S. PATENT DOCUMENTS

| | | | | |
|---|---|---|---|---|
| 4,206,550 | A * | 6/1980 | Boyett et al. | 33/286 |
| 5,754,287 | A * | 5/1998 | Clarke | 33/286 |
| 6,043,879 | A * | 3/2000 | Dong | 33/291 |
| 7,454,839 | B2 * | 11/2008 | Della Bona et al. | 33/283 |
| 2005/0204570 | A1 * | 9/2005 | Bascom et al. | 33/286 |
| 2006/0013278 | A1 * | 1/2006 | Raskin et al. | 33/286 |
| 2008/0047153 | A1 * | 2/2008 | Bona et al. | 33/283 |
| 2008/0066329 | A1 * | 3/2008 | Bascom et al. | 33/290 |
| 2008/0134529 | A1 * | 6/2008 | Van Luchene | 33/366.11 |

* cited by examiner

*Primary Examiner*—G. Bradley Bennett
(74) *Attorney, Agent, or Firm*—Edell, Shapiro & Finnan, LLC

(57) ABSTRACT

A light line generating device is configured to generate horizontal and vertical light lines on a work surface. The device includes a pendulum assembly, a pendulum lock mechanism, level indicator device, a light line generating assembly. The pendulum assembly includes a gimbal mechanism that supports a pendulum such that the pendulum levels within two planes. The lock mechanism is configured to selectively capture the pendulum. The level indicator device and the light line generating assembly are coupled to the pendulum. The device further includes a pendulum reorientation mechanism configured to reposition the gimbal. In operation, the device may be utilized to generate either a self-leveling horizontal light line or a manually-leveled vertical light line.

28 Claims, 13 Drawing Sheets

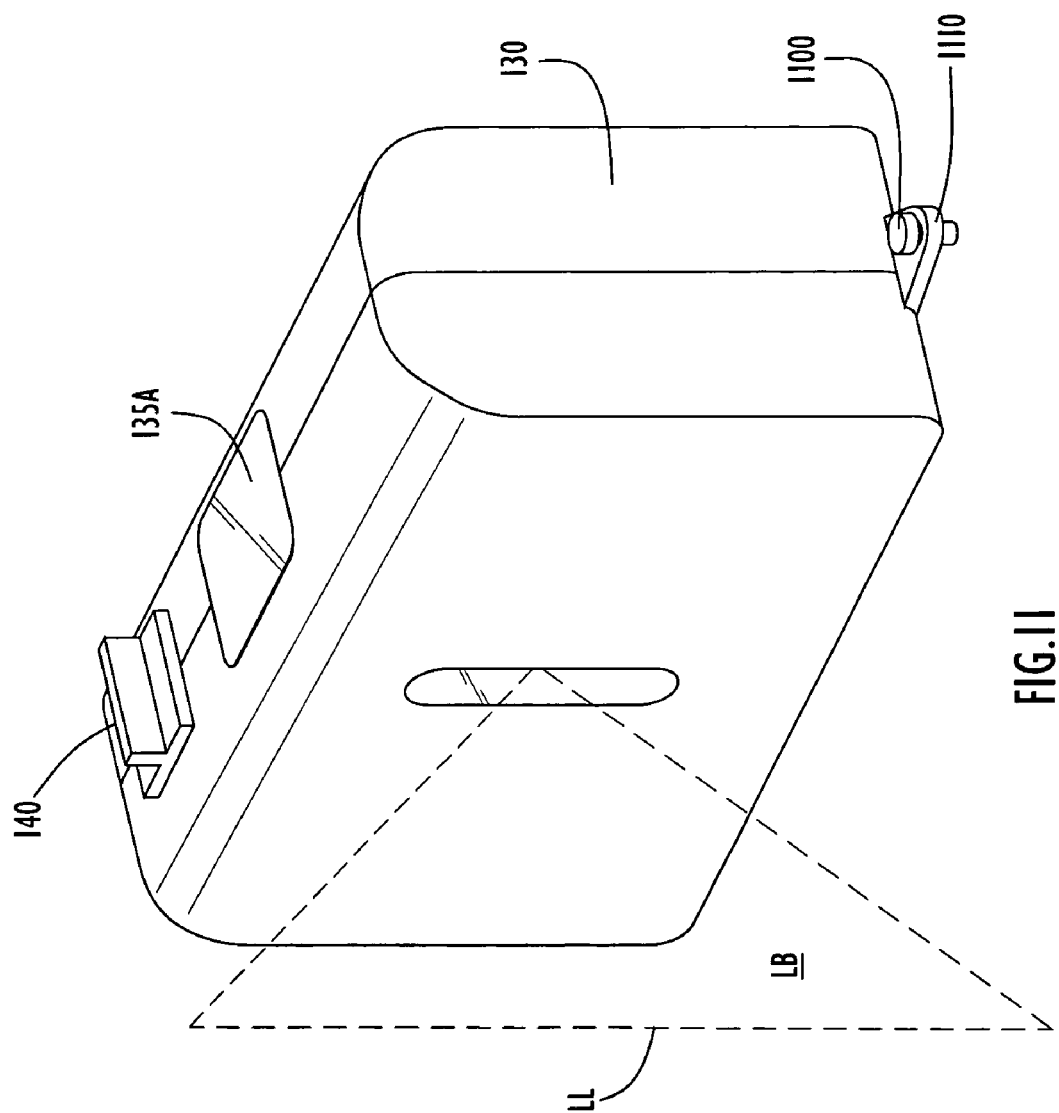

LIGHT LINE GENERATING DEVICE

FIELD OF THE INVENTION

The present invention relates to a light line generating device and, in particular, to a laser level including self-leveling and manual leveling modes of operation.

BACKGROUND OF THE INVENTION

Alignment of surfaces is a common problem in a variety of fields, ranging from construction to interior decorating. Proper spatial alignment is necessary to ensure that walls are perpendicular to a floor, or otherwise plumb. Laser level devices are often used in construction to produce a plane of light that serves as a reference for various projects. Laser level devices save considerable time and effort during the initial layout of a construction project as compared to other tools such as beam levels, chalk lines, or torpedo levels. Some examples of projects where laser level devices are useful include laying tile, hanging drywall, mounting cabinets, installing counter tops, and building outdoor decks.

SUMMARY OF THE INVENTION

A light line generating device is configured to generate horizontal and vertical light lines on a work surface. The device includes a pendulum assembly, a pendulum lock mechanism, level indicator device, a light line generating assembly. The pendulum assembly includes a gimbal mechanism that supports a pendulum such that the pendulum levels within two planes. The lock mechanism selectively captures the pendulum, preventing its pivotal movement. The level indicator device (e.g., a bubble via), as well as the light line generating assembly (e.g., a laser barrel), are coupled to the pendulum. The device further includes a pendulum reorientation mechanism configured to reposition the gimbal along an axle and, as such, alters the angle at which the light beam leaves the housing. In operation, the device may be utilized to generate either a self-leveling horizontal light line or a manually-leveled vertical light line.

BRIEF DESCRIPTION OF THE DRAWINGS

FIG. 11 illustrates a light line generating device in accordance with another embodiment of the invention.

Like reference numerals have been used to identify like elements throughout this disclosure.

DETAILED DESCRIPTION OF THE INVENTION

Figure 1:
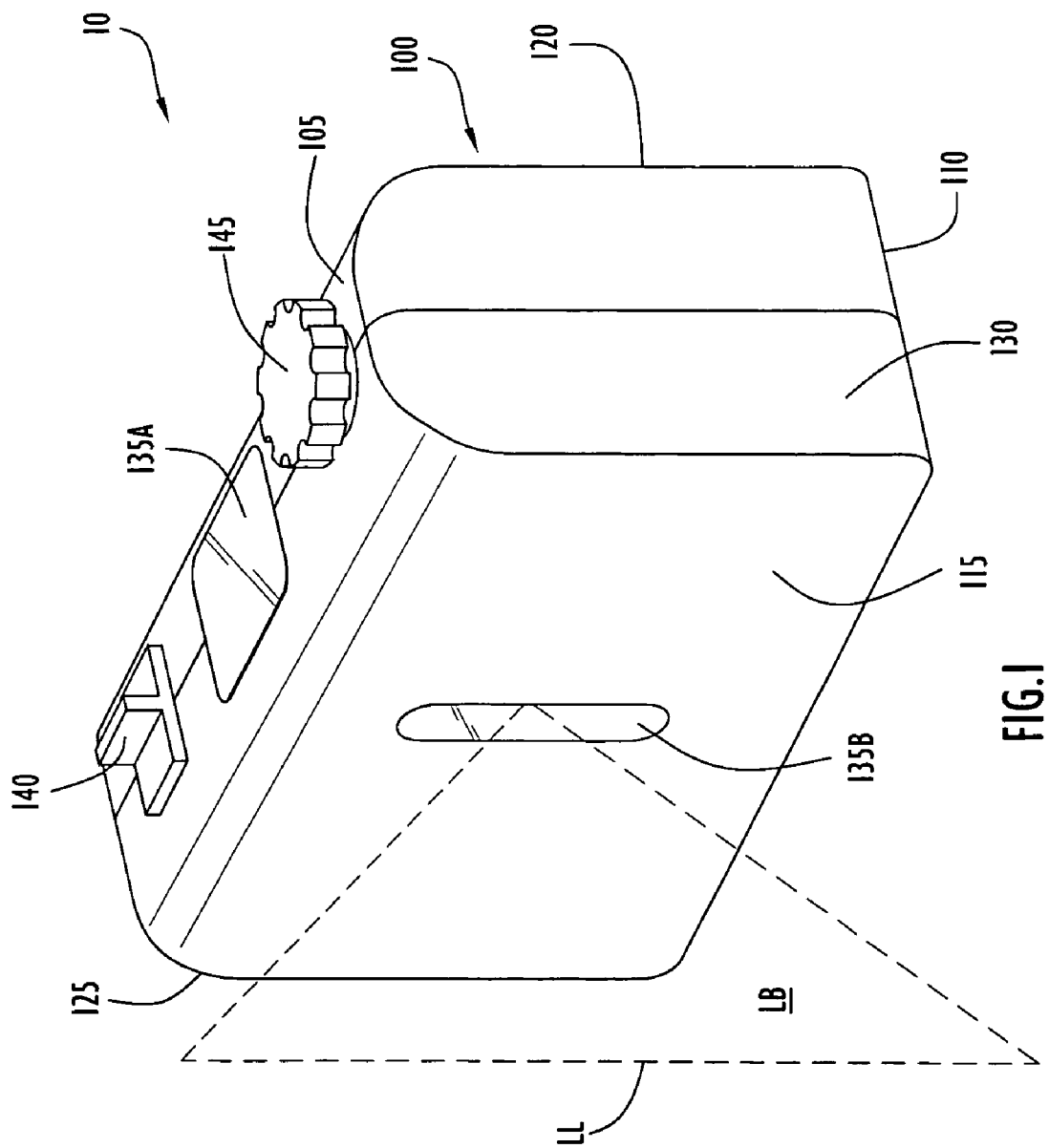
FIG. 1 illustrates a front perspective view of a light line generating device according to an embodiment of the present invention.

FIG. 1 is a front and perspective view of a light line generating device according to an embodiment of the present invention. As shown, the light line generating device 10 may include a housing or shell 100 with a top portion 105, a bottom portion 110, a front portion 115, a rear portion 120, a first end portion 125, and a second end portion 130. The housing 100 further includes one or more windows operable to permit the transmission of a light beam from the housing 100, as well as permit the viewing of interior components. The term window not only includes an opening with a transparent or translucent covering, but also to uncovered apertures through which a beam of light may pass. The number, shape, and/or dimensions of a window are not particularly limited to that which is illustrated herein. By way of specific example, as shown in FIG. 1, the housing includes a first window 135A disposed on the top portion 105 of the housing 100 and a second window 135 disposed in the front portion 115 of the housing 100. The housing 100 may further include a first actuator or switch 140 and a second actuator or knob 145. As discussed in greater detail below, the first actuator 140 may control a pendulum lock mechanism, while the second actuator 145 may control a gimbal reorientation mechanism.

The housing 100 may be formed from a hard, impact-resistant, preferably moldable material such as a hard thermoplastic material (e.g., ABS or polystyrene). The housing 100 may also include a grip portion formed from soft or low durometer thermoplastic elastomer adhered or overmolded to the housing 100. Alternatively or additionally, the grip portion may be formed from "soft-touch" elastomer materials such as SANTOPRENE, KRATON, and MONOPRENE.

Figure 2A:
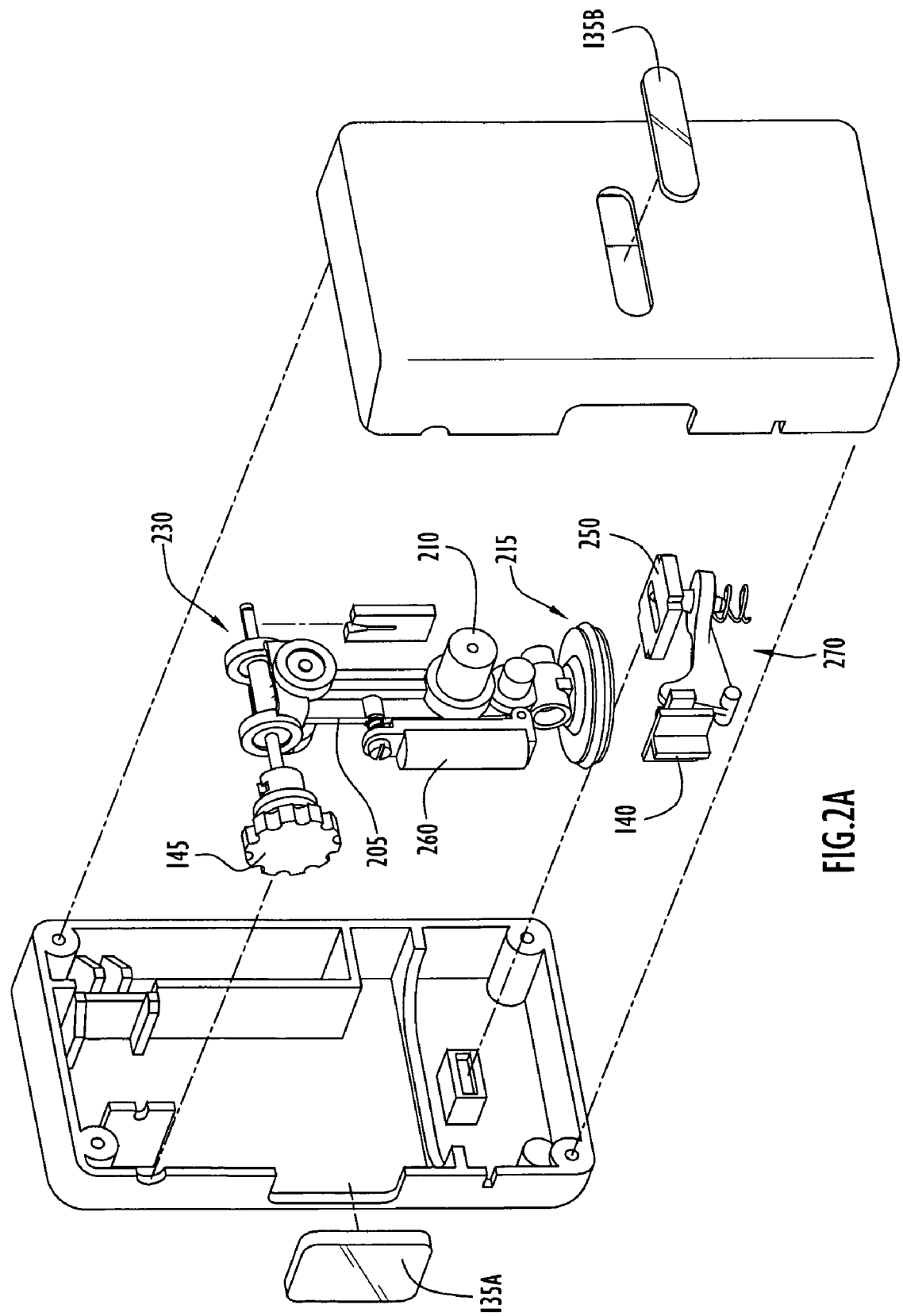
FIG. 2A illustrates an exploded view of the light line generating device shown in FIG. 1, with the front housing portion removed for clarity.
Figure 2B:
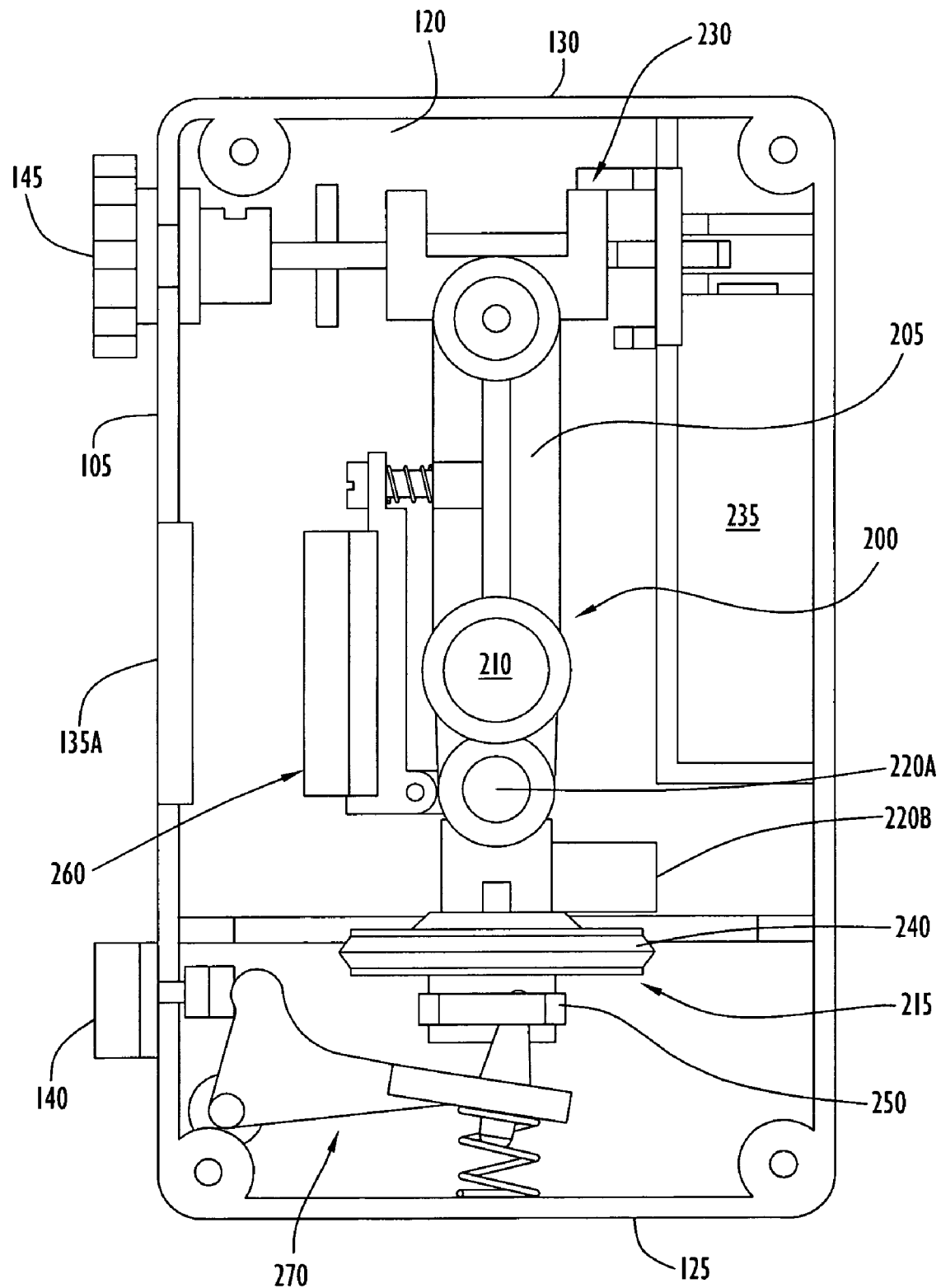
FIG. 2B illustrates a front, internal view of the device shown in FIG. 2A.

The light line generating device 10 contains a pendulum assembly. FIGS. 2A and 2B are exploded and front views of the light line generating device 10 of FIG. 1, respectively, with the front housing portion 115 removed for clarity. In the embodiment illustrated, the pendulum assembly 200 includes a pendulum 205, a light line generating device or light source 210, a damping mechanism 215, and a calibration mechanism including, e.g., one or more balance screws 220.

Figure 3:
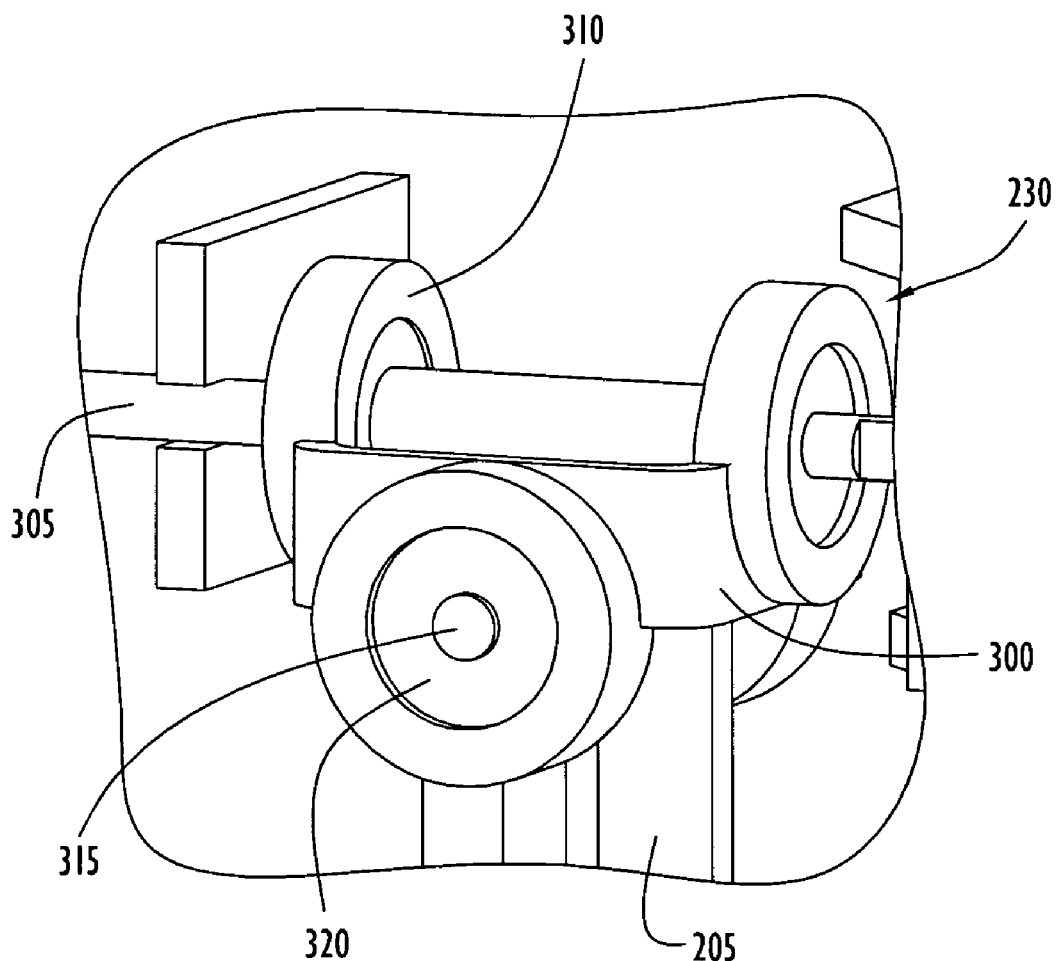
FIG. 3 illustrates a close-up view of the gimbal assembly of the device shown in FIG. 1.

The pendulum 205 is pendulously suspended within the housing 100 via, e.g., a gimbal assembly 230. The gimbal assembly 230 defines two generally orthogonal axes of rotation/pivot. Referring to FIG. 3, the gimbal assembly 230 may include a gimbal body 300 coupled to the housing 100 via a first or main axle 305. A first pair of bearings 310 rotatably couples the gimbal body 300 to the main axle 305. The pendulum 205, in turn, may be rotatably coupled to the gimbal body 300 along a second or pendulum axle 315 having a second pair of bearings 320. In the embodiment shown, the main axle 305 defines an axis that is generally perpendicular to the axis defined by the pendulum axle 315. The gimbal assembly 230 also provides the pendulum 205 with a fluid and consistent pivotal motion. A guide member (not illustrated) may further be provided to direct and/or limit the degree and/or direction of pivot in the pendulum 205. By way of example, the pendulum 205 may swing about 12° (±6° from its normal (0°) position).

With the above-described configuration, the pendulum 205 is capable of swinging within the housing 100 along two intersecting planes (or, in other words, along two orthogonal axes), creating a self-leveling pendulum assembly 200 operable to create a substantially horizontal (level) light line when the light line generating device 10 is placed against a work surface such as a wall. The pendulum 205 may self-level even if the work surface is uneven, or even if the device 10 is placed against the work surface in a slightly tilted orientation.

Figure 9A:
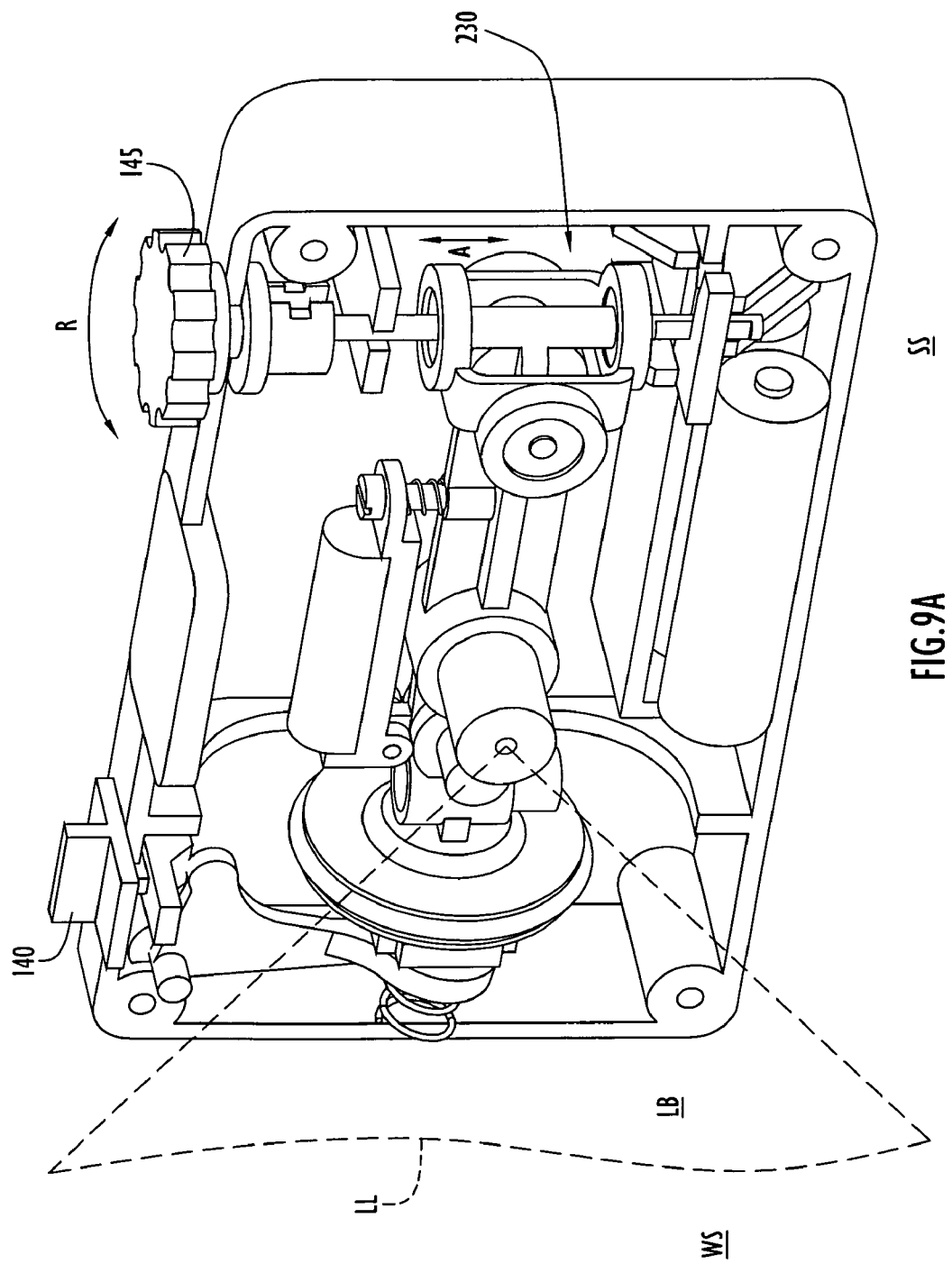
FIG. 9A illustrates the operation of the light line generating device, with the front cover portion removed for clarity, showing the generation of a light plane.

Referring back to FIGS. 2A and 2B, the light source 210 may include a device operable to generate a light beam LB such as a light plane or line. The light source 210 may be fixed to the pendulum 205, proximate its lower end. By way of example, the light source 210 may include, but is not limited to, a laser assembly including a barrel that houses a laser diode, a collimating lens, and a line lens. The collimating lens forms a laser beam exiting the laser diode into a beam having a generally oval cross-section. The line lens then converts the laser beam into multiple, super-imposed planar beams (i.e., laser planes having different focal distances). Once generated, the light beam LB travels out of the housing 100, through the second window 135B and onto a work surface to generate a light line LL (FIG. 1). Additional information regarding the configuration of the light source 210 and, in particular, an exemplary laser assembly, is disclosed in U.S. Published Patent Application No. 2006/0013278 (Raskin et al.), the disclosure of which is incorporated herein by reference in its entirety. The light source may be situated on the pendulum 205 to generate a light beam (light plane) that is generally perpendicular to the longitudinal axis of the pendulum 205 (seen in FIG. 9A). In other words, the pendulum assembly 200 provides a self-leveling, horizontal light beam LB.

A power source 235, connected to the light source 210, may be controlled via a switch operable to engage and disengage power to the light source (switch not illustrated).

The damping mechanism 215 is capable of decreasing the amplitude of the pendulum 205 about both of its axes. The damping mechanism 215 may be any mechanism suitable for its described purpose (i.e., damping the motion of pendulum 205). By way of example, the damping mechanism 215 may include base or bar 240 disposed at the bottom end of the pendulum 205. The bar 240 may include a metal plate (e.g., copper) on its underside. A magnet 250 (e.g., an annular magnet) is positioned within the housing 100 to maintain a gap having a predetermined width between the bar 240 and the magnet 250 as the pendulum 205 swings within the housing 100. By way of example, the magnet 250 may be coupled to a wall of the housing 100. The interaction between the eddy currents in the bar 240 with the magnetic field of the magnet 250 causes damping of swaying motion of pendulum 205. Further information regarding the damping mechanism 215 may be found in U.S. Pat. No. 5,144,487, the disclosure of which is incorporated herein by reference in its entirety.

The calibration mechanism of the pendulum assembly 200 is operable to calibrate the orientation of the pendulum 205 within the housing 100. By way of example, the calibration mechanism may include a first balance screw 220A and a second balance screw 220B disposed proximate the base of the pendulum 205. The calibration mechanism may be utilized to adjust the position of the pendulum 205 along each axis which, in turn, permits the angular adjustment of laser beam LB generated by the light source 210 along a plane relative to the housing 100.

Figure 4:
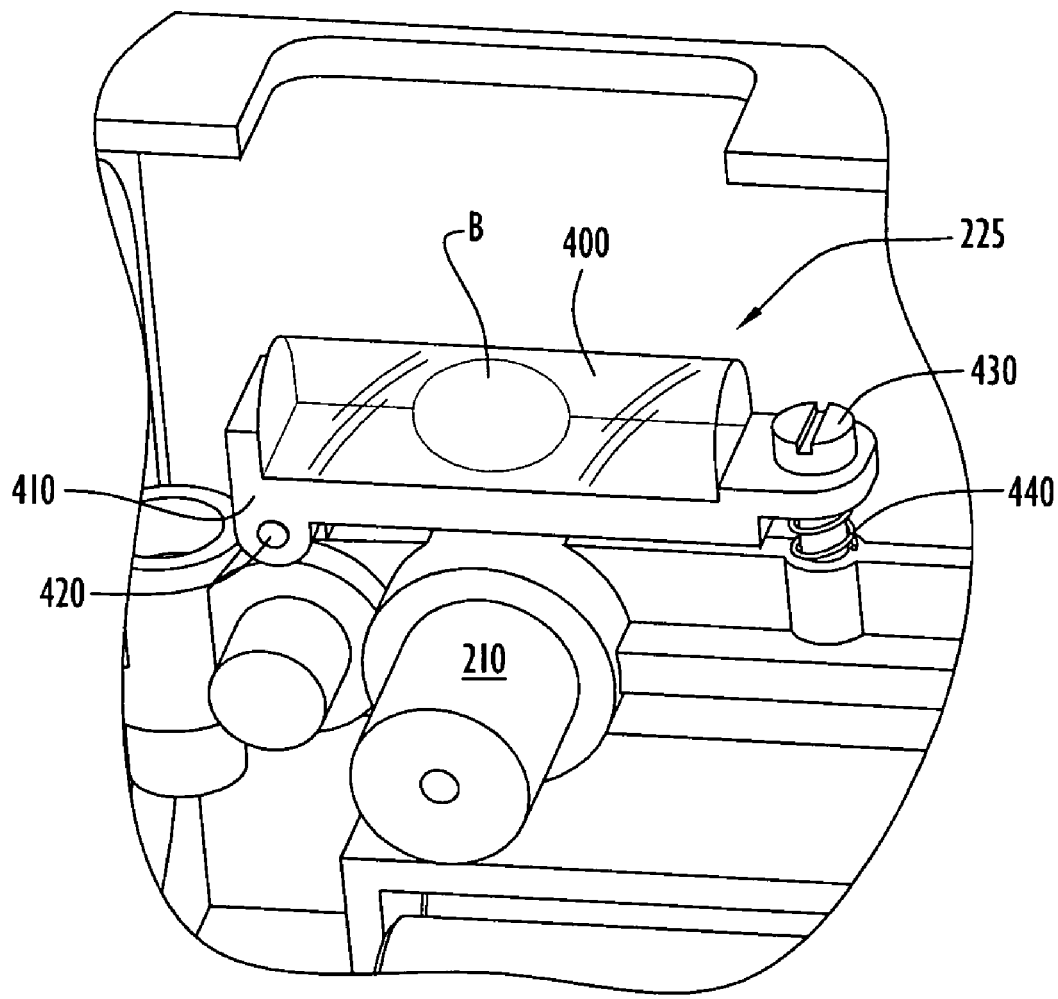
FIG. 4 illustrates a close-up view of a bubble vial coupled to the pendulum of the pendulum assembly.

The device further includes a level indicator assembly 260 to indicate the orientation of the pendulum 205 within the housing 100. FIG. 4 is a close-up view of level indicator assembly 260. In the embodiment shown, the level indicator assembly 260 includes a spirit or bubble level 400 (also called a spirit or bubble vial) mounted onto the pendulum 205 via a vial support or holder 410. The bubble level 400 is generally aligned with the first window 135A; consequently, it is viewable from the exterior of the housing 100.

The level indicator assembly 260 may be calibrated to align the bubble B of the bubble vial 400 with the vertical orientation of the light beam (laser plane) generated by the light source 210. One end of the vial support 410 may be rotatably connected to the pendulum 205 via a pin 420. The other end of the vial support 410 may be secured to the pendulum 205 via a calibration screw 430. The screw portion of the support 400 is biased upward by a biasing member 440 such as a spring. With this configuration, adjusting the depth of the calibration screw 430 rotates the support 410 about the pin 420, permitting the calibration of the level indicator 400, i.e., the alignment of bubble center position with the vertical orientation the light beam LB.

Figure 5A:
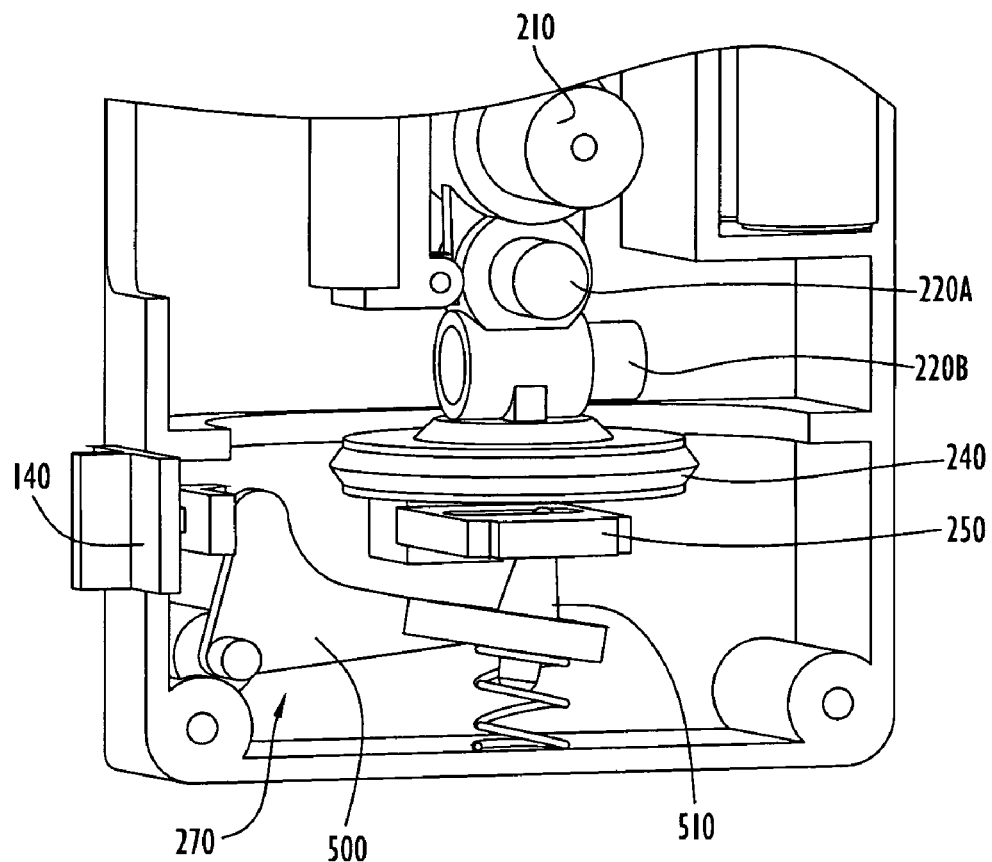
FIG. 5A illustrates a close-up view of the lock mechanism, showing a lever assembly engaging the pendulum assembly.
Figure 5B:
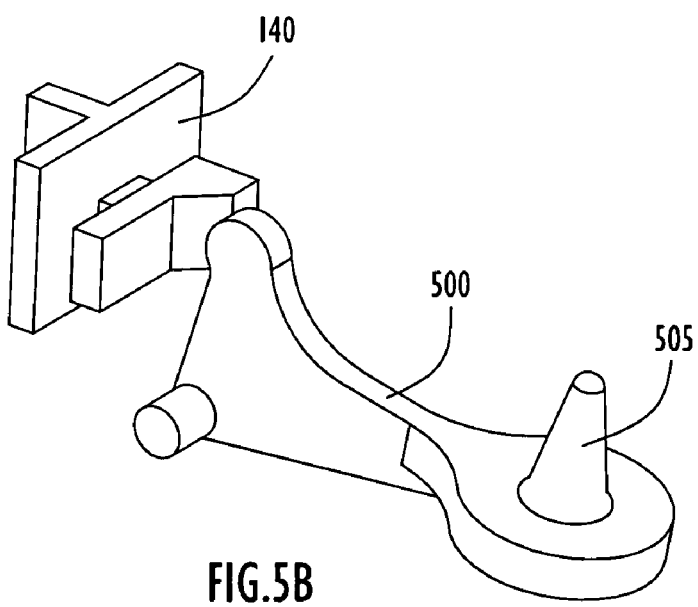
FIG. 5B illustrates an isolated view of the lever assembly shown in FIG. 5A.

The lock mechanism 270 stabilizes the pendulum 205, selectively preventing its pivotal motion. FIG. 5A illustrates a close-up view of the pendulum lock mechanism 270 and FIG. 5B illustrates the lock mechanism of FIG. 5A in isolation. In the embodiment illustrated, the lock mechanism 270 includes a lever 500 pivotally mounted to the housing 100. The lever 500 includes a stop cone or boss 505 operable to engage the pendulum 205, as well a stop spring 510 (FIG. 6B) that biases the stop cone 500 against the base of the pendulum 205. The base of the pendulum 205 may include a central recessed area that receives the tip of the cone 505. The cone 505 preferably aligns with the central, longitudinal axis of the housing 100; consequently, when engaged by the cone 505, the pendulum 205 is held stationary at a central/normal (approximately 0°) position.

Figure 6A:
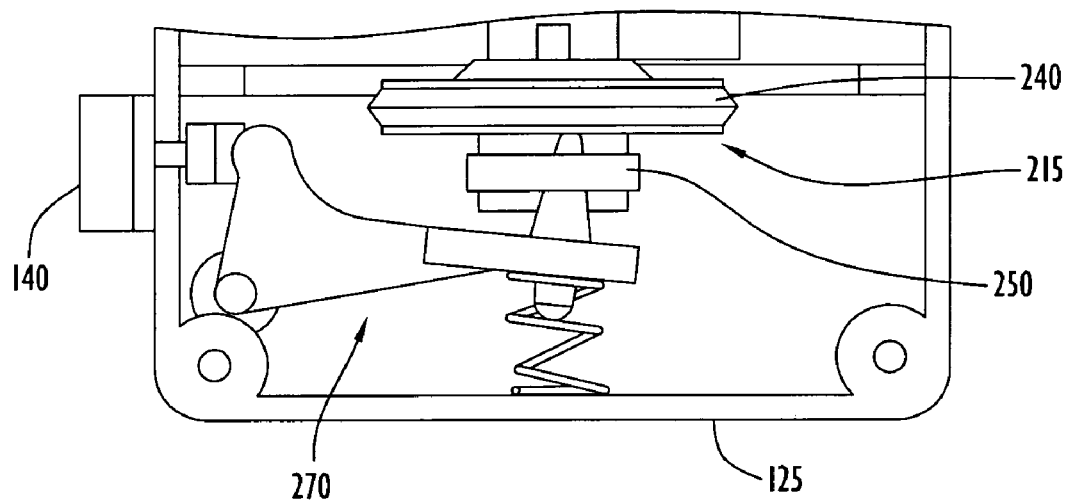
FIGS. 6A and 6B illustrate the operation of the lock mechanism.
Figure 6B:
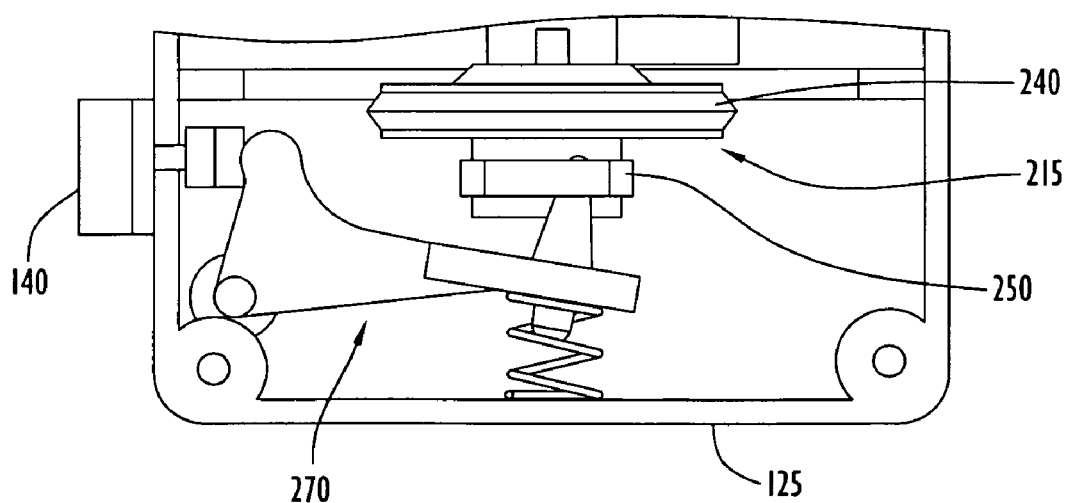

The operation of the lock mechanism 270 is explained with reference to FIGS. 6A and 6B, which illustrate front, internal views of the light line generating device 10 of FIG. 2B. The first actuator 140 is in communication with the lever 500, controlling its pivot. Referring to FIG. 6A, the lever 500 begins in its normal, engaged position (in which the stop cone 505 passes through the center of the annular magnet 250 and contacts the bottom surface of the pendulum bar 240). In this position, the pendulum 205 is secured and its pivotal movement is prevented. This, in turn, generally immobilizes the light source 210. Engaging the first actuator 140 (e.g., driving it upward (indicated by arrow U)) overcomes the biasing force of the spring 510, driving the lever 500 downward, away from the bar 240 of the pendulum 205. In this disengaged position, the pendulum 205 is free to pivot about its axes, permitting the pendulum assembly to self-level as described above.

In this manner, a user may selectively activate the self-leveling feature of the light line generating device 10. Selectively preventing the movement of the pendulum 205 relative to the housing 100 not only prevents damage to the pendulum 205 during storage and/or transport, but also enables a user to stabilize the light line generated on the work surface (i.e., it prevents the light line from self-leveling). As a result, the housing 100 may be rotated manually to project a light line onto the work surface at an angle other than substantially horizontal and/or substantially vertical.

Figure 7:
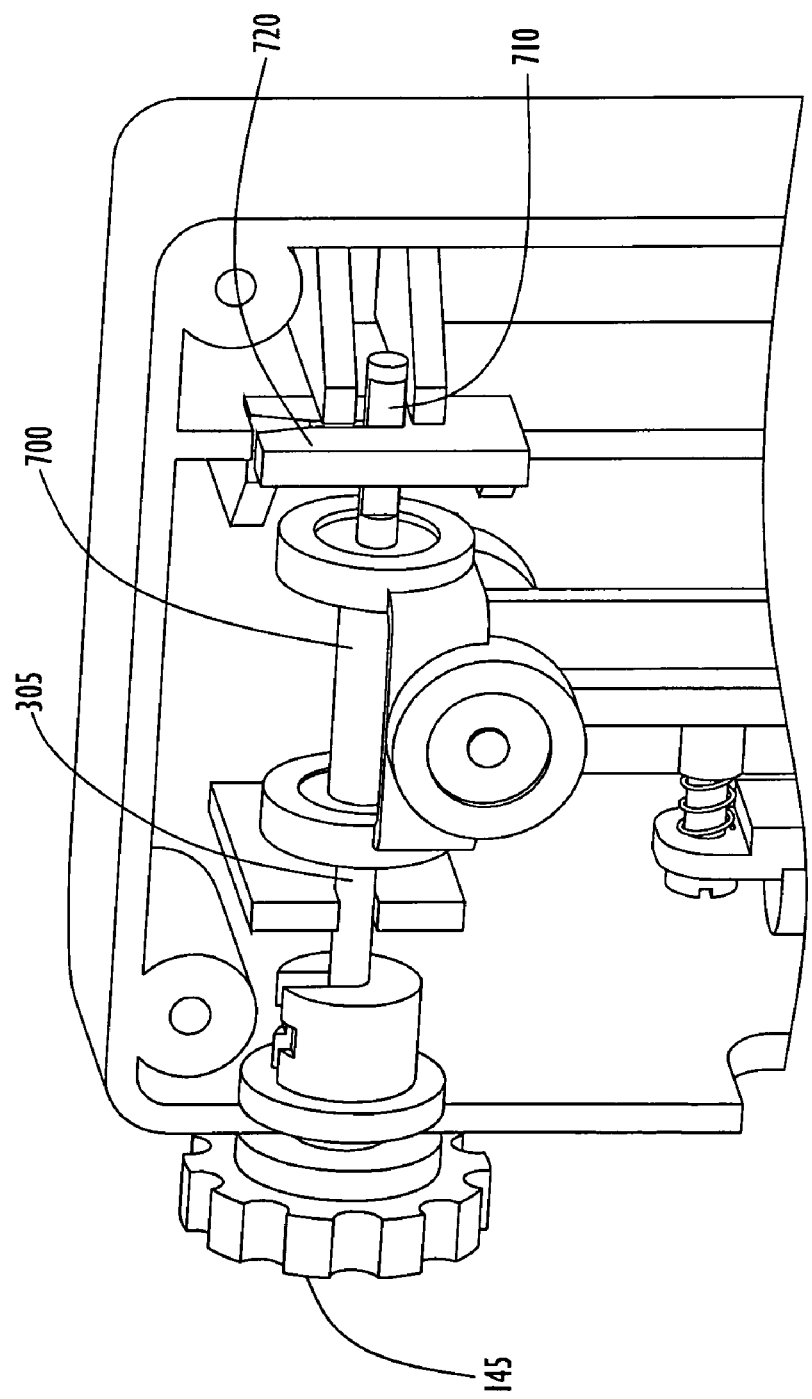
FIG. 7 illustrates a close-up view of the pendulum assembly reorientation mechanism.

In addition, since the lock mechanism 270 secures the bottom of the pendulum 205, the angle of the pendulum 205 may be manually adjusted utilizing the gimbal reorientation mechanism. The gimbal reorientation mechanism is configured to reposition the gimbal assembly 230 and manually level the light beam LB on a work surface. Referring to FIG. 7, the gimbal body 300 may further include a sleeve 700 fixed to the main axle 305. One end of the main axle 305 is coupled to the second actuator or knob 145, while the opposite end of the main axle 305 has machined flats 710 captured within a rotation stop or yoke 720 secured to the housing 100. Manipulating the second actuator 145 causes the axial displacement of the main axle 305 within the housing 100. For example, the knob 145 may threadingly engage the main axle 305 such that rotating the knob draws the main axle into our out of the knob. Consequently, when the knob 145 is rotated, the main axle 305 is axially displaced within the housing 100, moving the gimbal assembly 230 toward the left or right sides of the housing (from the perspective of FIG. 2B).

Figure 8A:
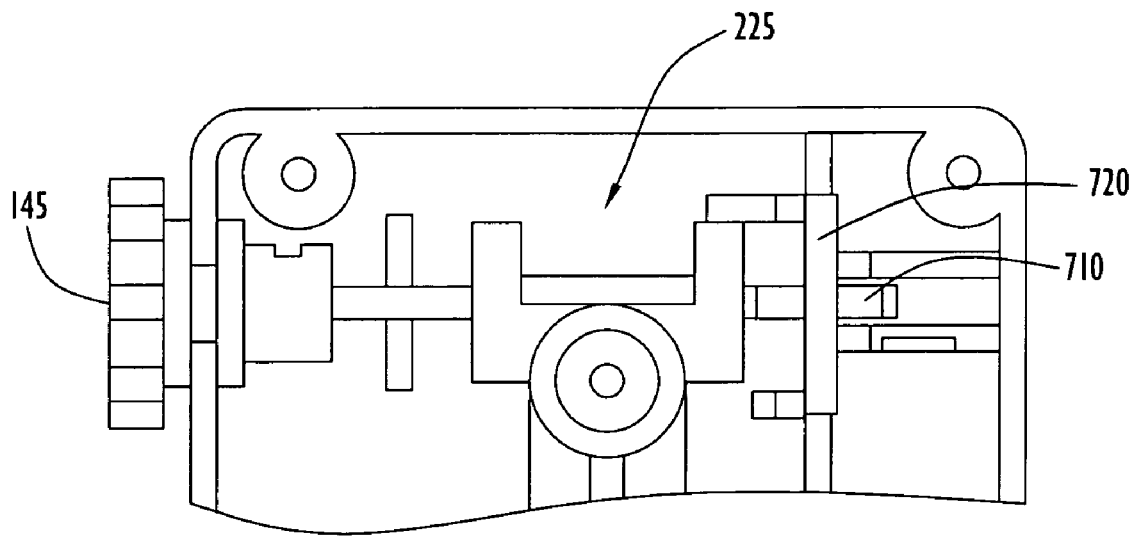
FIGS. 8A and 8B illustrate the operation of the pendulum assembly reorientation mechanism shown in FIG. 7.
Figure 8B:
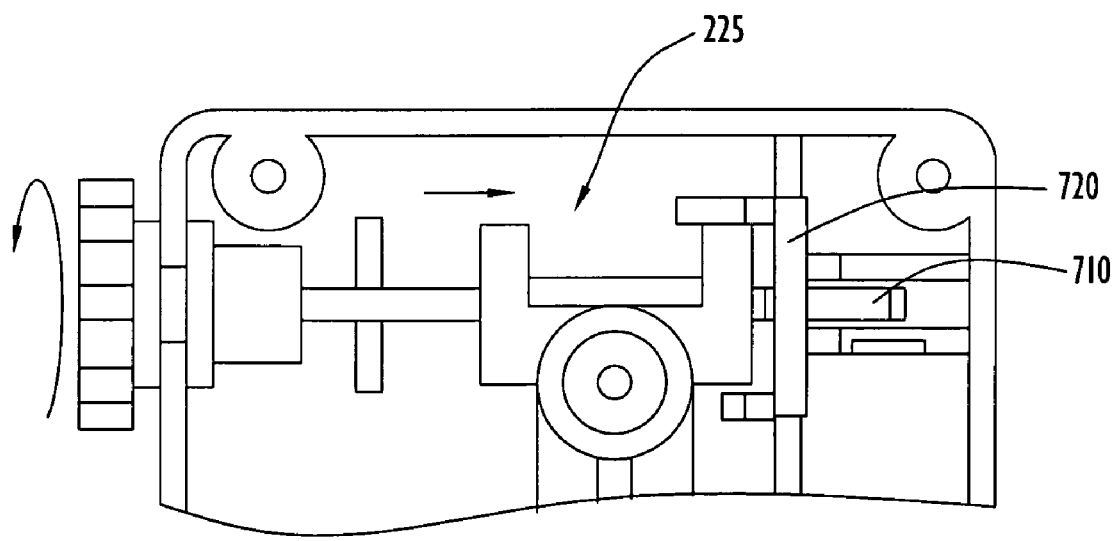

Operation of the reorientation mechanism is explained with reference to FIGS. 8A and 8B. The gimbal body 300 begins in a first position, with the pendulum 205 positioned proximate the center of the main axle 305 (and thus generally aligned with the central, longitudinal axis of the housing 100) (FIG. 8A). Rotating the knob 145 (indicated by arrow R), urges the main axle 305 (and thus the gimbal body 300) toward the yoke 720. As a result, the gimbal assembly 230 moves from the first position illustrated in FIG. 8A to a second position illustrated in FIG. 8B, where the pendulum 205 is shifted off of center, toward the right side of the housing 100 (from the perspective of FIG. 8B).

Figure 9B:
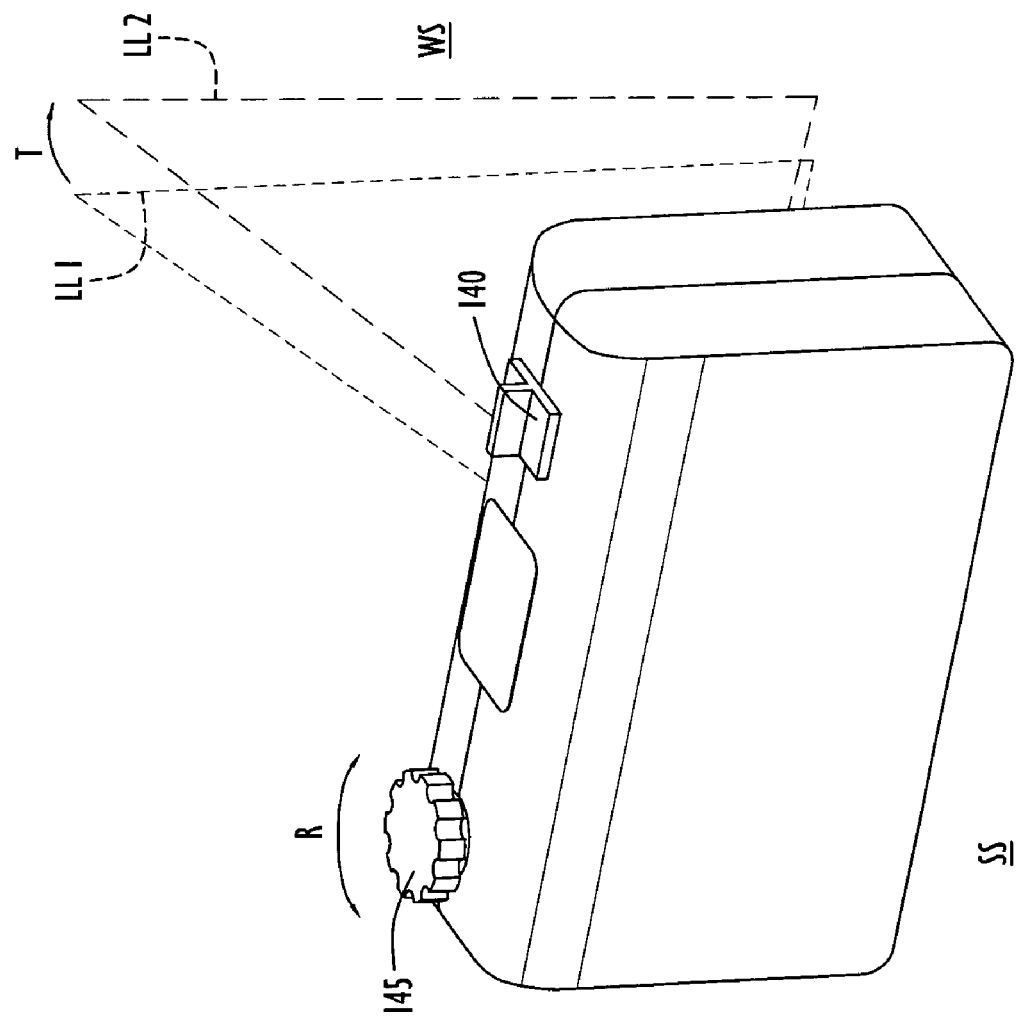
FIG. 9B illustrates a rear perspective view of the light line generating device, showing the formation of a tilt-adjustable light line on a work surface.

The gimbal reorientation mechanism may be utilized to manually adjust/level the orientation of the light beam LB generated by the light source 210. Specifically, referring to FIGS. 9A and 9B, the device 10 is oriented/placed on a support surface SS such that the device 10 projects a vertical line on a work surface WS. The lock mechanism 270 is engaged and the knob 145 is rotated (indicated by arrow R) to move the gimbal assembly 230 up and down (from the perspective of FIG. 9A) (indicated by arrow A). Since the bottom of the pendulum 205 is held stationary by the lock mechanism, repositioning the gimbal assembly 230 alters the angle of the pendulum 205 within the housing and, as such, the angle of the pendulum with respect to the support surface SS. Consequently, the tilt angle (indicated by arrows T in FIG. 9B) of the light line LL on the work surface WS may be adjusted. Referring to FIG. 9B, the light line LL may be repositioned on the work surface SS such that moves from a first light line position (indicated by LL1) to a second light line position (indicated by LL2), and vice versa. By way of specific example, the knob 145 may be rotated until the bubble in the bubble vial 400 is aligned with the center of the vial. When the bubble B is in the center of the vial 400 the light beam LB (light plane) projecting from the laser is plumb (true vertical).

Figure 10A:
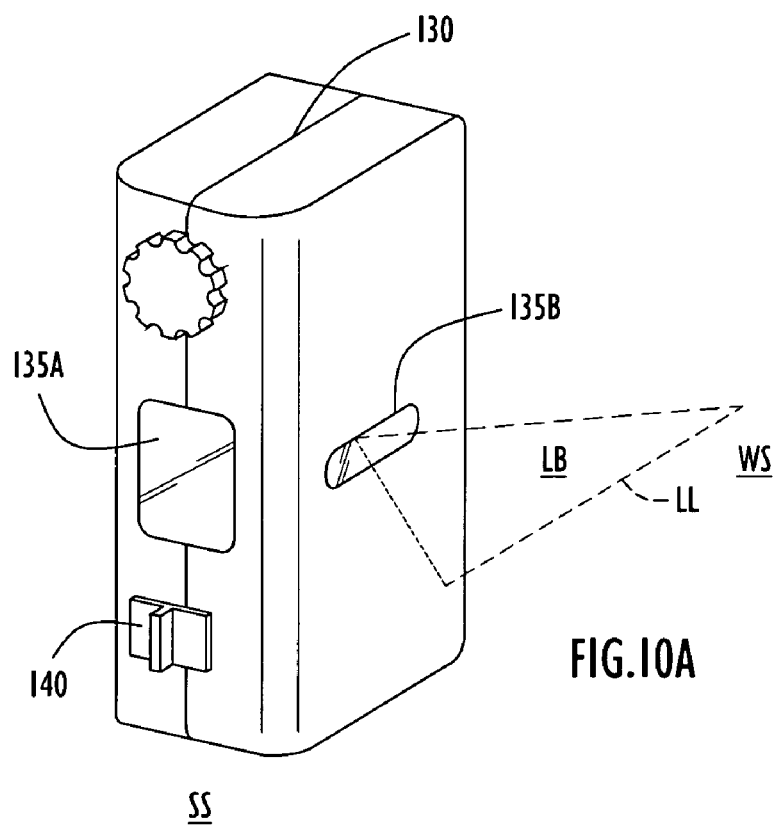
FIG. 10A illustrates the operation of the light line generating device in a first mode of operation, showing the generation of a generally vertical light line.
Figure 10B:
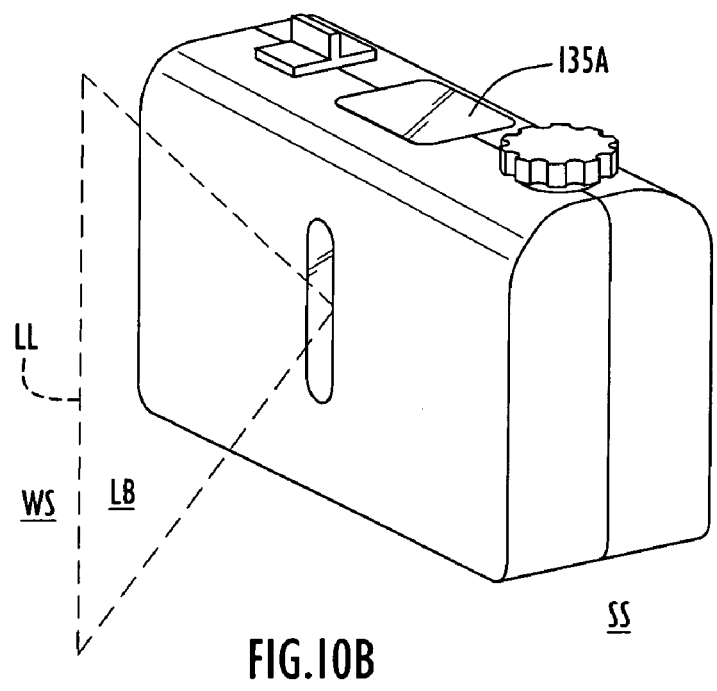
FIG. 10B illustrates the operation of the light line generating device in a second mode of operation, showing the generation of a generally horizontal light line

The operation of the light line generating device 10 is explained with reference to FIGS. 10A and 10B. The device is capable of two modes of operation—a self-leveling mode and manual-leveling mode. In the self-leveling mode (FIG. 10A), the device 10 is positioned such that first end portion 125 faces downward (e.g., the first end may contacts a generally horizontal support surface SS). The first actuator 140 is set to disengage the lock mechanism from the pendulum 205 as described above. As a result, the pendulum 205 is free to level along two planes, generating a horizontal light line LL on the work surface WS (e.g., a generally vertical surface such as a wall).

In the manual-leveling mode, the first actuator 140 is set to the lock position, wherein the stop cone 410 engages the pendulum 205 to secure it in a stationary position as described above. The device 10 is positioned on a support surface SS such that the bottom housing portion 110 contacts the supporting surface SS. The light source 210 is activated, generating a generally vertical light line LL on the work surface WS as described above. A user may then engage the knob 145 to displace the gimbal assembly 230 within the housing 100, reorienting the pendulum assembly (and specifically the pendulum 205) until the bubble in the bubble vial 400 is centered when viewed through the first window 135A as described above. When the bubble is on center, the light line LL is plumb (true vertical) with respect to the work surface WS.

FIG. 11 illustrates the light line generating device 10 in accordance with another embodiment of the invention. The construction is similar to that described above, except that, instead of the gimbal reorientation mechanism (i.e., the second actuator 145), the device 10 includes an external leveling screw 1100 connected to the second end portion 130 via a tab 1110. In operation, the device 10 is positioned on a work surface WS in a manner similar to that described above. The device remains self-leveling in the horizontal mode. To manually level the vertical line, device 10 should be positioned on generally horizontal surface then the leveling screw 1100 is adjusted until the level indicator 225 is centered in a similar manner to that described above.

Thus, the embodiments of the present invention not only provide two modes of operation (self-leveling and manual-leveling), but also provide a light line generating device capable of generating both horizontal and vertical light lines utilizing a single light source 210 (i.e., only one laser line generator used for both vertical and horizontal line projection). The level indicator 225, being coupled to the pendulum and viewable from the exterior of the housing 100, further enables the true plumb light lines LL.

While the present invention has been described in detail and with reference to specific embodiments thereof, it will be apparent to one skilled in the art that various changes and modifications can be made therein without departing from the spirit and scope thereof. For example, while the device has been shown with a self-leveling horizontal line and a manually leveled vertical line, the device may be configured to generate a manually leveled horizontal line and a self-leveling vertical line.

The housing 100 of the light generating device 10 may possess any suitable dimensions, and may be any shape suitable for its described purpose (e.g., the housing may be polygonal (square), circular, etc). The housing 100 may be shaped to prevent its placement on a horizontal surface such as a floor. The light source 210 may be any source capable of producing a light beam and directing it toward a work surface.

The windows 135A, 135B may be of any shape and include any desired dimensions. The windows 135A, 135B, moreover, may be sized to prevent the light beam LB from projecting out of housing 100 when the pendulum assembly 200 contacts another component disposed within housing 100. Additionally, the windows 135A, 135B may further prevent the light beams LB from exiting the housing 100 when the pendulum assembly 200 approaches the limits of its angular range. In other words, assuming an angular range being between about −6° to about +6° from normal (i.e., a vertical centerline to where the pendulum assembly 200 self-levels), and where pendulum assembly 200 may travel at any angle beyond this range, the size and/or shape of the windows 135A, 135B may be configured to block the light beams when the pendulum 205 travels beyond about −5° and/or about +5° from normal. This configuration prevents a user from relying on the emitted beam (as substantially horizontal or vertical) when the pendulum has nearly reached or surpassed its range of motion—as the beam may no longer actually represent true plumb or horizon.

The gimbal assembly 230 may include any mechanism configured to orient the pendulum along one or more axes and/or along one or more planes. In addition, the actuators 140, 145 may include any suitable switches disposed at any suitable locations.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

The invention claimed is:

1. A light beam generating device comprising:
   a housing including a window;
   a pendulum assembly disposed within the housing, the pendulum assembly including:
     a pendulum pendulously suspended within the housing,
     a light source coupled to the pendulum, wherein the light source is operable to generate a beam of light along a pathway; and
     a level indicator coupled to the pendulum,
   wherein the level indicator is viewable through the window of the housing to enable the user to determine the orientation of the light beam.

2. The light beam generating device of claim 1, wherein the level indicator comprises a bubble level.

3. The light beam generating device of claim 1, wherein the pendulum assembly is pendulously suspended within the housing via a gimbal assembly permitting movement along two intersecting planes.

4. The light beam generating device of claim 3, wherein the intersecting planes comprise generally orthogonal planes.

5. The light line generating device of claim 1, wherein:
   the pendulum comprises a proximal end and a distal end; and
   the pendulum assembly further comprises a lock mechanism operable to selectively secure the distal end of the pendulum in a stationary position.

6. The light line generating device of claim 5, wherein the lock mechanism comprises a lever and a stop cone, the stop cone selectively engaging the distal end of the pendulum to secure the pendulum in the stationary position.

7. The light line generating device of claim 1, wherein the pendulum assembly is pendulously suspended within the housing via a gimbal assembly that is selectively repositionable within the housing.

8. A light line generating device comprising:
   a housing; and
   a self-leveling pendulum assembly including:
     a pendulum pendulously suspended within the housing, and
     a light source coupled to the pendulum, wherein the light source generates a light line onto a work surface, and
     a pendulum reorientation mechanism operable to selectively move the pendulum from first position within the housing to a second position within the housing, wherein moving the pendulum from the first pendulum position to the second pendulum position repositions the light line on the work surface,
   wherein the light line generating device operates in a first mode of operation, in which the light line is self-leveling, and in a second mode of operation, in which the light line is manually leveled.

9. The light line generating device of claim 8, wherein:
   the pendulum includes a proximal end and a distal end; and
   the proximal end of the pendulum is coupled to a gimbal assembly permitting movement along two intersecting planes.

10. The light line generating device of claim 9, wherein the gimbal assembly is configured to translate with respect to the housing.

11. The light line generating device of claim 9, wherein:
    the gimbal assembly comprises:
      a primary axle coupled to the housing,
      a gimbal body coupled to the axle,
      a secondary axle oriented generally transverse to the first axle, wherein the pendulum is pivotally mounted on the a second axle.

12. The light line generating device of claim 11 further comprising an actuator operable to selectively move the primary axle from a first primary axle position to a second primary axle position.

13. The light line generating device of claim 8, wherein the pendulum assembly further comprises a lock mechanism selectively operable to secure the distal end of the pendulum in a stationary position.

14. The light line generating device of claim 8, further comprising a level indicator mounted onto the pendulum.

15. The light line generating device of claim 8, wherein:
    in the first mode of operation, self leveling horizontal line is generated on the work surface; and
    in the second mode of operation, a manually leveled vertical line is generated on the work surface.

16. A light line generating device comprising:
    a housing including a window;
    a pendulum assembly disposed within the housing, the pendulum assembly including:
      a pendulum pendulously suspended within the housing, the pendulum defining a longitudinal axis,
      a light source coupled to the pendulum, wherein the light source is operable to generate a beam of light along a pathway, and
      a level indicator coupled to the pendulum, wherein the level indicator is viewable through the window of the housing to enable the user to determine the orientation of the pendulum;
    a gimbal assembly to support the pendulum, wherein the gimbal assembly is configured to move in a direction generally transverse to the longitudinal axis of the pendulum; and
    a lock mechanism configured to selectively stabilize the pendulum and prevent its pendulous motion.

17. The light line generating device of claim 16, wherein the gimbal assembly comprises:
    a first axle coupled to the housing;
    a gimbal body pivotally coupled to the axle; and
    a second axle oriented generally transverse to the first axle, wherein the pendulum is pivotally coupled to the second axle.

18. A method of creating a light line on a work surface, the method comprising:
    (a) providing a light line generating device including:
      a housing; and a pendulum assembly disposed within the housing, the pendulum assembly comprising:
  a pendulum pendulously suspended within the housing, the pendulum having a proximal end and a distal end,
  a light source coupled to the pendulum, wherein the light source generates a light line onto a work surface, and
  a level indicator coupled to the pendulum;
a lock mechanism configured to selectively engage the distal end of the pendulum; and
a gimbal assembly coupled to the pendulum, the gimbal assembly including a gimbal body repositionable with respect to the housing; and
(b) setting the lock mechanism in a disengaged position to permit the pendulous movement of the pendulum within the housing, causing the light line to self-level.

19. The method of claim 18 further comprising:
(c) setting the lock mechanism in an engaged position to stabilize the pendulum within the housing and prevent its pendulous movement; and
(d) repositioning the gimbal body within the housing to manually level the light line.

20. A method of creating a light line on a work surface, the method comprising:
(a) providing a light line generating device including:
  a housing,
  a light source disposed within the housing, wherein the light source generates a light line onto a work surface, and
  an indicator device disposed within the housing, the indicator device configured to generate an indication of at least one of level and plumb,
  wherein the indicator device is associated with the light source such that repositioning the light source within the housing alters the indication generated by the indicator device;
(b) positioning the light line generating device onto a supporting surface;
(c) directing a light line onto the work surface;
(d) maintaining the light line generating device in a stationary position while selectively repositioning the light source within the housing to reorient the light line generated onto the work surface; and
(e) reorienting the light line generated onto the work surface until a predetermined reading is provided by the indicator device.

21. The method of claim 20, wherein:
the housing comprises a window;
the indicator device is viewable through the window; and
(e) comprises:
  (e.1) reorienting the light line on the work surface while viewing the indicator device through the window, and
  (e.2) aligning the light line along the work surface until a predetermined reading is provided by the indicator device.

22. The method of claim 21, wherein the indicator device comprises a bubble vial.

23. The method of claim 20, wherein the repositioning the light source causes a corresponding repositioning of the indicator device.

24. The method of claim 20, wherein:
(c) comprises (c.1) directing a generally vertical light line onto the work surface, wherein the vertical line is out of plumb; and
(e) comprises (e.1) reorienting the light line generated onto the work surface until the predetermined reading provided by the indicator device indicates the vertical line is generally plumb.

25. A light line generating device comprising:
a housing;
a selectively repositionable light source disposed within the housing, wherein the light source generates a light line onto a work surface; and
an indicator device disposed within the housing, wherein the indicator device is configured to generate an indication of at least one of level and plumb;
wherein the indicator device is associated with the light source such that repositioning the light source within the housing alters the indication generated by the indicator device.

26. The light line generating device of claim 25, wherein repositioning the light source within the housing repositions the level indicator within the housing.

27. The light line generating device of claim 25, wherein:
the light source generates a generally vertical line onto the work surface; and
selectively repositioning the light source manually levels the vertical line from an out-of-plumb position to a plumb position, or vice versa, as indicated by the indicator device.

28. The light line generating device of claim 25, wherein the level indicator is a bubble vial.

* * * * *